United States Patent [19]

Cannon et al.

[11] Patent Number: 4,499,650

[45] Date of Patent: Feb. 19, 1985

[54] AUTOMATIC TOOL CHANGER

[75] Inventors: Lee E. Cannon, Bozeman, Mont.; Kentner B. Wilson, 801 Villard Rd., Bozeman, Mont. 59715

[73] Assignee: Kentner B. Wilson, Los Alamos, N. Mex.

[21] Appl. No.: 391,636

[22] Filed: Jun. 24, 1982

[51] Int. Cl.³ .......................................... B23Q 3/157
[52] U.S. Cl. ...................................... 29/568; 211/1.5; 414/233
[58] Field of Search ............... 29/568, 26 A; 211/1.5; 414/233, 750

[56] References Cited

U.S. PATENT DOCUMENTS

| | | | |
|---|---|---|---|
| 3,191,260 | 6/1965 | Jorgensen | 29/568 |
| 3,276,116 | 10/1966 | Stark | 29/568 |
| 3,277,568 | 10/1966 | Wetzel | 29/568 |
| 3,311,973 | 4/1967 | Anthony et al. | 29/568 |
| 3,332,142 | 7/1967 | Lehmkuhl et al. | 29/568 |
| 3,526,033 | 9/1970 | Saunders | 29/568 |
| 3,568,849 | 3/1971 | Hutchison | 211/60 |
| 3,571,912 | 3/1971 | Kielma | 29/568 |
| 3,590,470 | 7/1971 | Brainard | 29/568 |
| 3,604,565 | 9/1971 | Freeman | 211/60 |
| 3,662,442 | 5/1972 | Noa | 29/568 X |
| 3,684,101 | 8/1972 | Bradford et al. | 29/568 X |
| 3,691,626 | 9/1972 | Mousseau et al. | 29/568 |
| 3,829,109 | 8/1974 | Koch | 279/91 |
| 3,837,070 | 9/1974 | Ochiai et al. | 29/568 |
| 3,844,028 | 10/1974 | Hague et al. | 29/568 |
| 3,845,546 | 11/1974 | Rutschke | 29/568 |
| 3,911,540 | 10/1975 | Johnson et al. | 29/568 X |
| 3,953,039 | 4/1976 | Hauge et al. | 279/1 |
| 3,964,616 | 6/1976 | Piotrowski | 214/1 BD |
| 4,103,405 | 8/1978 | Blum et al. | 29/26 A |
| 4,126,233 | 11/1978 | Jeske | 214/1 BB |
| 4,164,290 | 8/1979 | Zankl | 29/568 X |
| 4,196,501 | 4/1980 | Shimasiri | 29/568 X |
| 4,338,709 | 7/1982 | Straub et al. | 29/568 X |
| 4,358,888 | 11/1982 | Zankl et al. | 29/568 |

FOREIGN PATENT DOCUMENTS 2410444 2/1975 Fed. Rep. of Germany ........ 29/568

Primary Examiner—William R. Briggs
Assistant Examiner—Glenn L. Webb

[57] ABSTRACT

A machine tool is provided with automatic tool changing apparatus 50 comprising a carousel 56 having tool stations 60. Each tool station is mounted for independent horizontal and vertical movement relative to the carousel and has an arcuate cone 65 for facilitating entry and removal of tools 10. The carousel 56 is mounted horizontally on the machine tool table and is rotatable by the machine tool spindle in conjunction with the standard machine tool motors which move the table. The apparatus 50 includes a tool release mechanism 100, including a pawl 112, for operating a quick change tool holder 30, and a cover assembly 70 for protecting tools and tool adaptors held by the carousel.

10 Claims, 9 Drawing Figures 4,499,650

AUTOMATIC TOOL CHANGER

BACKGROUND OF THE INVENTION

The present invention relates to machine tools in general, and more specifically to apparatus for holding and automatically exchanging tools used in a machine tool operation.

As is well known by those skilled in the art, numerically controlled machine tools have been used widely to perform various complex operations on a workpiece. Machine tools using numerical controls can be programmed to perform various operations in succession, some of which require successive tool changes.

Both automatic tool changing devices and manual "quick change" devices have been used to increase the speed and efficiency of machine tools. Some manual quick change devices are relatively simple to operate and provide both a quick release or quick engagement of a tool. However, the manual devices lack efficiency because of the necessity of a manual change.

Previously used automatic tool changing devices have been complex, often having several extra arms which grasp and handle tools, transferring tools between a machine tool spindle and a storage rack. These devices typically require extra machine tool motions to operate the additional arms which add to the time required for a tool change. Furthermore, many previously used devices require extra space to allow uninhibited travel of the additional components. Auxiliary motors are typically required to operate tool change arms, etc. Such motors are costly, and can be bulky and require additional space.

SUMMARY OF THE INVENTION

The present invention is an automatic tool changing apparatus which is compact, simple to operate, and capable of making quick tool changes. The apparatus utilizes the existing capabilities of numerically controlled machine tools for manual-type quick change tool holders.

The present invention is a tool changing apparatus which in a preferred embodiment includes a rotatable carousel. The tool changer is suitable for mounting directly on a machine tool table. The carousel includes independently mounted and supported collars which are movable vertically and horizontally relative to the carousel. Each tool station includes a collar for receiving a tool adaptor. A tool release mechanism operates a quick change tool holder assembly which is carried by the machine tool. The release mechanism includes a pawl for gripping a tool holder lock nut. A tool holder cam operates a movable stop mechanism for selectively engaging the pawl and the lock nut. A spring assembly further assists in selective engagement of the pawl and the lock nut. The carousel is rotated by the machine tool spindle operated in conjunction with movement of the machine tool table by the standard machine tool motors. The tool release mechanism is actuated by rotation of the tool holder by the machine tool spindle. The tool changer includes a compact cover assembly for protecting tools and tool adaptors in storage.

DESCRIPTION OF A PRESENTLY PREFERRED EMBODIMENT

Figure 1:
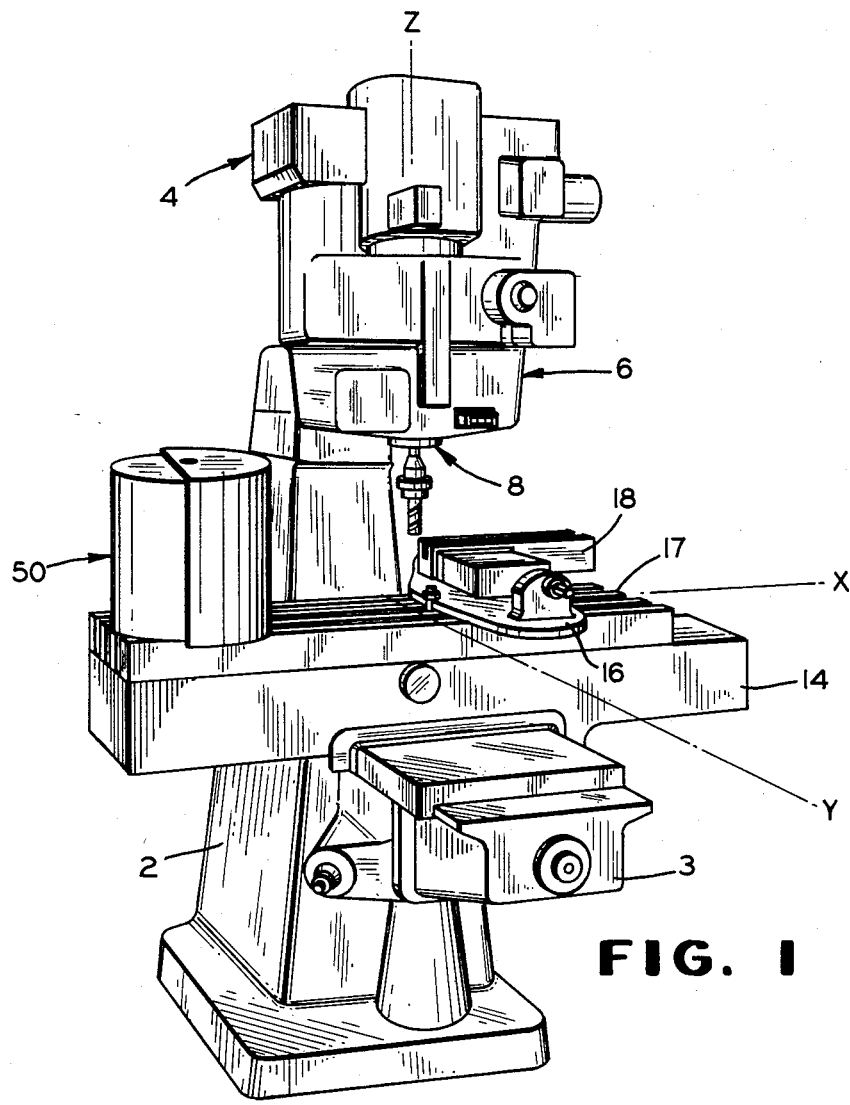
FIG. 1 illustrates a machine tool having an automatic tool changing apparatus according to the present invention.

FIG. 1 illustrates a vertical milling machine utilizing the automatic tool changing apparatus of the present invention. Although a vertical milling machine is illustrated in FIG. 1, those skilled in the art will appreciate that the present invention is applicable to machine tools in general. The vertical milling machine includes a pedestal 2, from which a knee 3 extends forwardly, and a head 4 which overhangs the knee. The head 4 supports a quill 6 for vertical but non-rotatable movement relative to the pedestal. The quill 6 supports a vertically disposed spindle 8 which is constrained to move vertically with the quill, but is free to rotate relative thereto. The lower end of the spindle 8 is adapted to drive a tool 10, as will be described. Spindle 8 is rotatable in both directions at selectively variable speeds by an electric drive motor (not shown) as is well known by those skilled in the art. The vertical axis along which quill 6 and spindle 8 are movable is termed the Z axis.

The machine tool knee 3 slidingly supports a saddle 14 for horizontal movement along the Y axis. A table 17 is slidably supported on the saddle for horizontal movement transversely to the movement of the saddle, i.e., along the X axis. The table 17 has a mounting fixture 16 to which a workpiece 18 is secured. A sequence of specific machining operations is performed on the workpiece by successive use of various tools. A tool magazine 50 is secured to the left side (as viewed in FIG. 1) of the table 17 on a portion of the table that is generally not utilized during machining operations. It is well known by those skilled in the art that movement of the saddle 14 relative to the knee 3 is controlled by a Y axis motor, and movement of the table 17 relative to the saddle 14 is controlled by an X axis motor.

TOOL HOLDER

Figure 2:
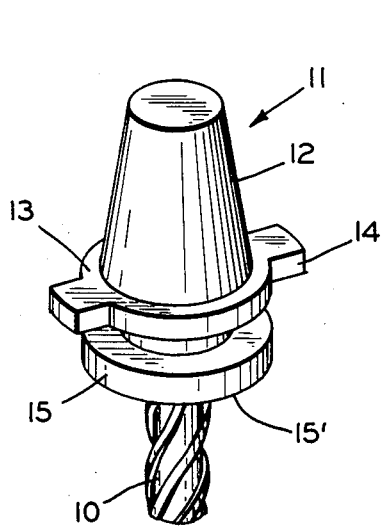
FIG. 2 is an isometric view of a quick change type tool adaptor according to the present invention.

To fully appreciate and understand the present invention, it is necessary to understand the operation of a quick-change type tool adaptor mechanism. FIG. 2 illustrates a cutting tool 10 held by a tool adaptor 11 which is suitable for use in conjunction with a quick change mechanism. The adaptor 11 includes a tapered body 12, a generally cylindrical collar 13, and a pair of diametrically opposed radially outwardly extending lugs 14 on the collar. The adaptor 11 further includes a stepped annular nose ring 15 press fit underneath the collar 13. Alternatively, the nose ring may be machined onto a suitable adaptor. The underside 15' of the nose ring 15 is suitable for gripping a mating surface on the tool magazine as will be described hereinafter.

Figure 3:
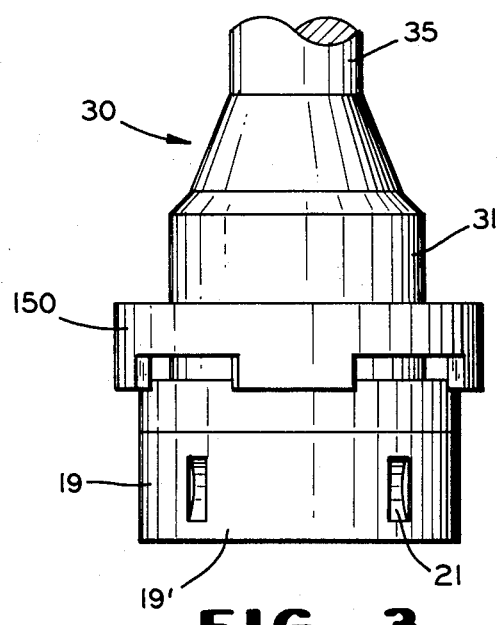
FIG. 3 illustrates a quick change type tool holder assembly for use in conjunction with the tool changing apparatus of FIG. 1.
Figure 4:
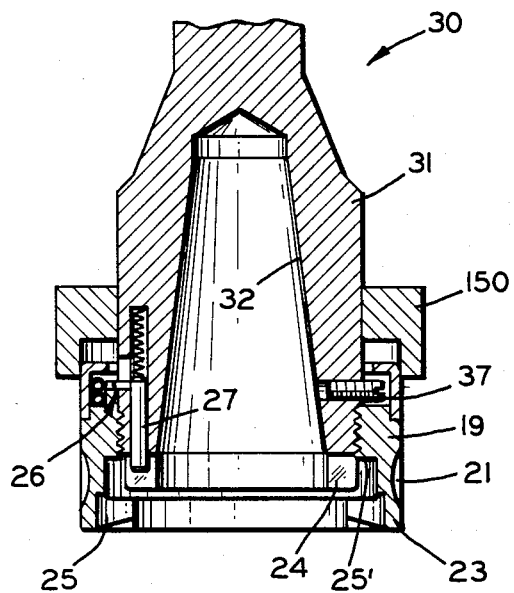
FIG. 4 is a cross sectional side view of the tool holder assembly of FIG. 3.

The tool adaptor 11 is received in the tool holder assembly 30 illustrated in FIGS. 3 and 4. The tool holder assembly comprises a shaft 35 which engages the machine tool spindle 8, a support member 31 rigidly affixed to the shaft 35, and a lock nut 19 threaded to the support member 31 opposite the shaft 35. A four-lobe cam 150 is press fit onto the support member for operating a tool release mechanism as will be described.

As seen in FIG. 3, the external surface 19' of the lock nut 19 defines four axially extending slots 21 for engaging an automatic tool release mechanism. Four slots are preferred because the preferred tool holder assembly 30 is fully operable upon a lock nut rotation of less than 90°. The preferred cam 150 has four lobes because the preferred lock nut 19 has four slots. The external surface 19' is a smooth surface to allow a slot engaging pawl to slide easily between the slots 21, as will be described.

The tool holder assembly support member 31 has a tapered internal surface 32 for mating with the tapered body 12 of the tool adaptor 11. The threaded end of the support member 31 defines diametrically opposed slots 24 for receiving the tool adaptor lugs 14. The open end of the nut 19 has an annular flange 23 which defines a pair of diametrically opposed slots 25 through which the tool adaptor lugs 14 are received. When the lock nut slots 25 are aligned with the support member slots 24, the tool adaptor 11 can be inserted or withdrawn from the tool holder assembly. The lock nut slots 25 have cam surfaces 25' for engaging the lugs 14 to eject a tool adaptor from the assembly 30. The support member 31 is provided with a radially projecting stop 37 which limits rotation of the lock nut 19 and which aligns slots 25 and 24 when the lock ring 19 is rotated to an "open" position.

In operation, the lock nut 19 is rotated between 45° and 60° relative to the support member 31 to align the support member slots 24 and the lock nut slots 25. A compression closing spring is compressed during the nut rotation. When the lock nut 19 hits the stop 37, a mechanical latch (shown generally at 26) is engaged to hold the nut 19 in its open position. The latch 26 is operated by a trigger pin 27 which extends axially into one of the support member slots 24. When a tool adaptor 11 is received within the tool holder assembly 30, the trigger pin 27 is depressed by one of the tool adaptor lugs 14. The trigger pin 27 thereby releases the latch 26, allowing the compression spring to rotate the lock nut 19 to a closed position, thereby drawing the tool adaptor into the support member 31. The tool holder assembly maintains locking grip on the tool adaptor 11 until the lock nut is rotated to an open position, releasing and ejecting the adaptor.

Those skilled in the art will be familiar with the above-described tool holder assembly operation. Additional details of the tool holder assembly 30 and its operation can be found in U.S. Pat. No. 3,829,109 assigned to Houdaille Industries, Inc. Commercially available manual "quick change" devices can be converted according to the present invention by adding a nose ring 15 to the adaptor, and a cam 150 to the adaptor assembly 30, and by machining off any knurled nut surface to provide a smooth surface 19'.

TOOL CHANGER

Figure 5:
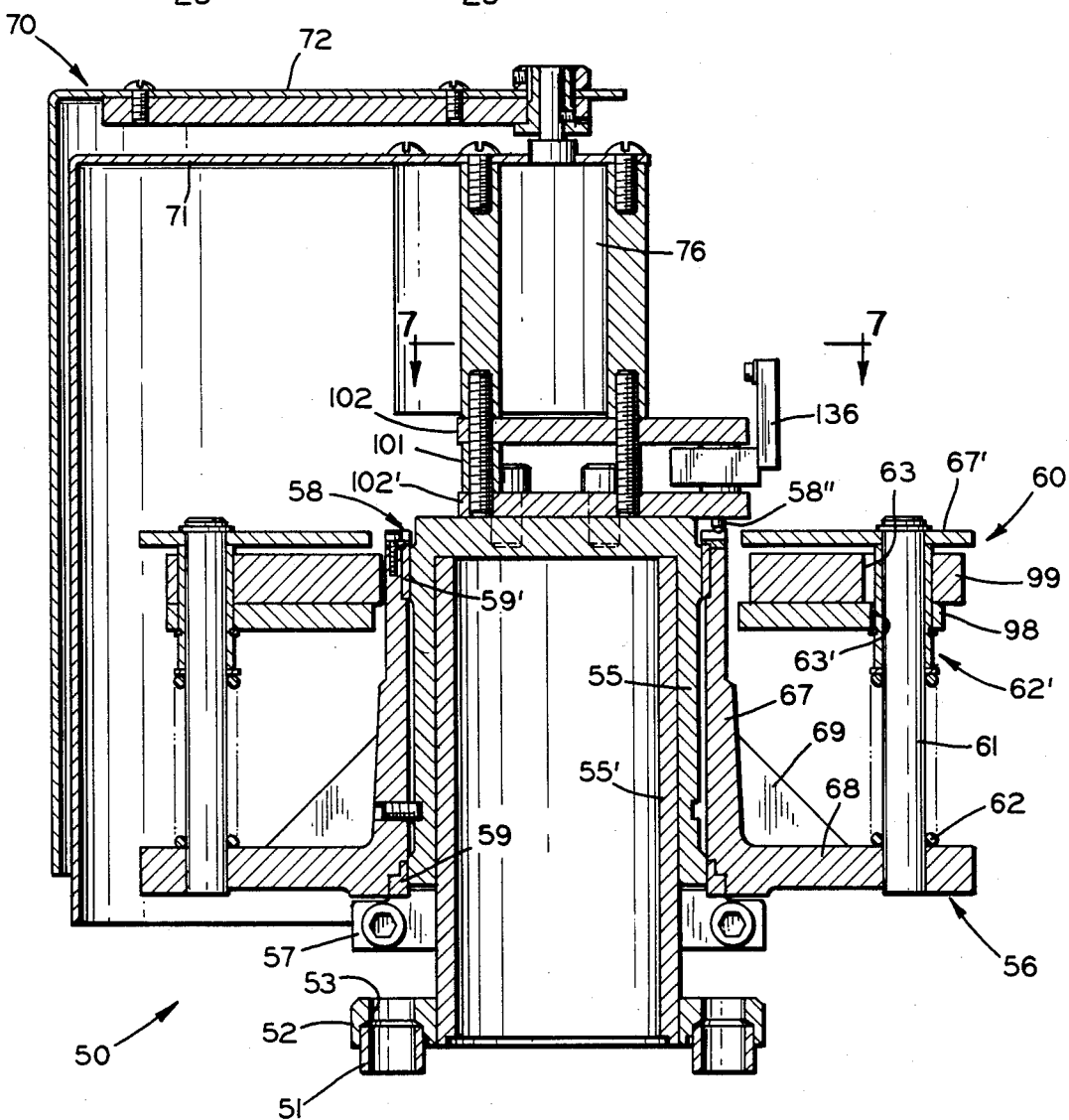
FIG. 5 is a cross sectional side view of the tool changing apparatus of FIG. 1.
Figure 6:
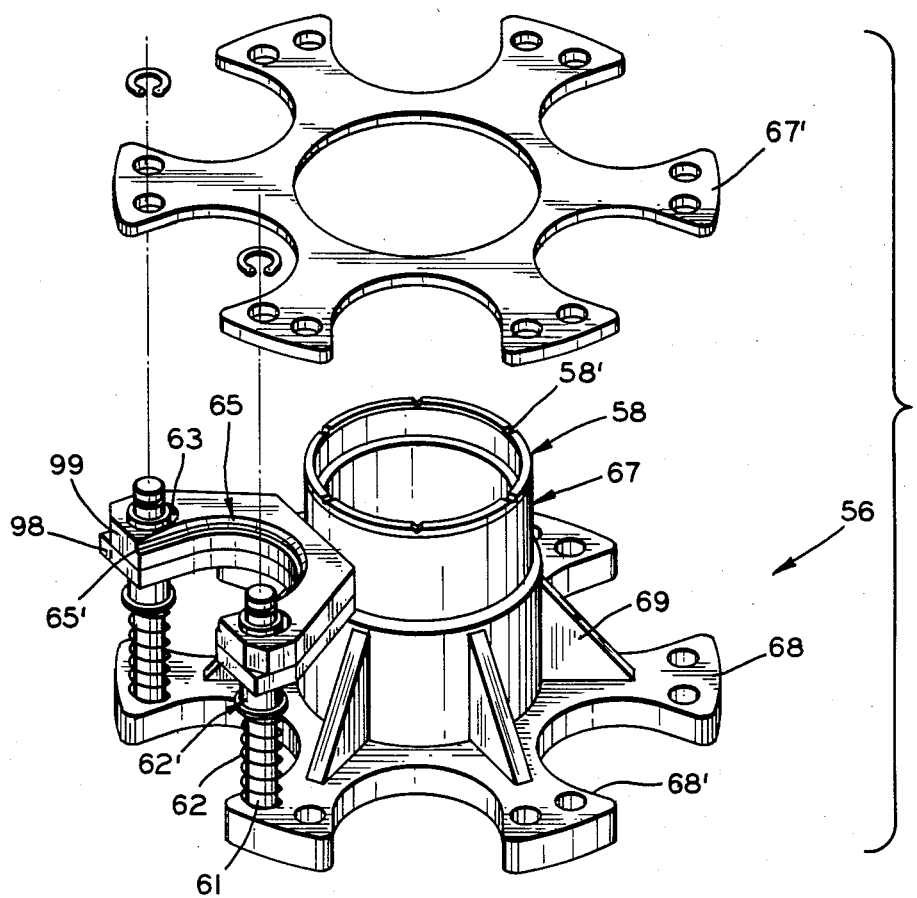
FIG. 6 is an isometric view of a portion of the carousel assembly of the tool changing apparatus of FIG. 1.

Referring to FIG. 5, the automatic tool changer 50 includes a six-station tool carousel or turret. The tool changer 50 has a base 52 which is mounted onto the milling machine table 17 by means of T-bolts (not shown) which fit into the T-slots of the table. The T-bolts are received by two sleeves 51 which are press fit into two holes 53 in the base. The base includes an integral vertical column 54 which supports a spindle 55. The spindle 55 is clamped to the base column 55' by a two-piece height adjustment flange 57. The spindle 55 can be adjusted vertically to accommodate longer or shorter tools by loosening the flange 57 and raising or lowering on the base column 55'.

The spindle 55, through bearings 59 and 59', rotatably supports a carousel 56 having six equally spaced tool stations 60. The carousel 56 has a cylindrical center section 67 and a base section 68, with six gussets 69, one between each tool station, providing support therebetween. The base section 68 defines six openings 68', one between each gusset plate 69, to allow clearance for tools being inserted or removed from the carousel. A detent ring 58 having six equally spaced detent slots 58' is affixed to the upper end of the carousel section 67. A spring and ball detent 58" is affixed to the release mechanism and extends into the respective slots 58' when the carousel tool stations are properly aligned with the release mechanism.

The carousel 56 includes a one-piece spider 67' similar in shape to the carousel base section 68. The carousel base 68 has twelve holes in which are rigidly mounted posts 61 for independently supporting six tool stations 60. The upper portions of each post 61 are affixed to the spider by snap rings. A coil spring 62 is wrapped around each post 61 for biasing the tool station upwardly away from the carousel base 68. A ring and bushing assembly 62' is provided atop each spring 62 to pass vertical forces from the tool station 56 to the spring 62.

Below the spider 67', the twelve posts 61, through the bushing and ring assemblies 62' independently support six trays 98, each of which in turn supports an adaptor yoke 99 for receiving a tool adaptor. Each adaptor yoke 99 includes two radially extending slots 63 through each of which extend a post 61. Each tray 98 includes two holes 63' through each of which pass a post 61. The tray 98 is axially but not radially movable relative to the carousel base 68. However, each adaptor yoke 99 is movable relative to the carousel base in two directions. First, each adaptor yoke 99 can move vertically or axially on its two posts 61 against the forces of the springs 62. The springs 62 normally hold the tool station in its upwardmost position. The vertical deflection is used in the tool pick-up cycle as will be described. Second, the yoke 99 may move radially relative to the carousel base 68 via the slots 63. Radial, horizontal movement is required during the tool release cycle as will be described. The slots 63 permit about three-sixteenths inches relative radial movement of the tool station.

Each adaptor yoke 99 includes a stepped collar 65 for receiving the mating nose ring 15 of an associated tool adaptor 11. The collar 65 extends circumferentially about 204°. The arcuate collar 65 permits a shortened vertical tool clearance for inserting or removing a tool adaptor, while having a sufficient circumferential dimension to hold the tool securely. The collar 65 may extend between just over 180° and just under 360°, depending upon the particular tools being used, while still being capable of holding the tools and allowing tools to be removed without lifting them entirely above the yoke 99. The yoke 99 includes step or ledge 65' for frictionally engaging the underside 15' of the nose ring 15.

Referring back to FIG. 5 the tool changer 50 includes a cover assembly 70 comprising two substantially identical semi-cylindrical halves 71 and 72. The cover 71 is rigidly affixed to the spindle 55 through a standoff 73. An AC motor 76 is rigidly affixed to the cover 71 and spindle 55, also through the standoff 73. A clutch assembly 95 is attached to the top of motor 76 to support the door 72, which is rotatable about the central column of the carousel. The motor 76 is selectively operable by the numerical control of the machine tool. The primary purpose of the cover assembly 70 is to protect the tools and tool adaptors, particularly the tapered portions 12, from contamination by dust or machining chips.

Figure 7:
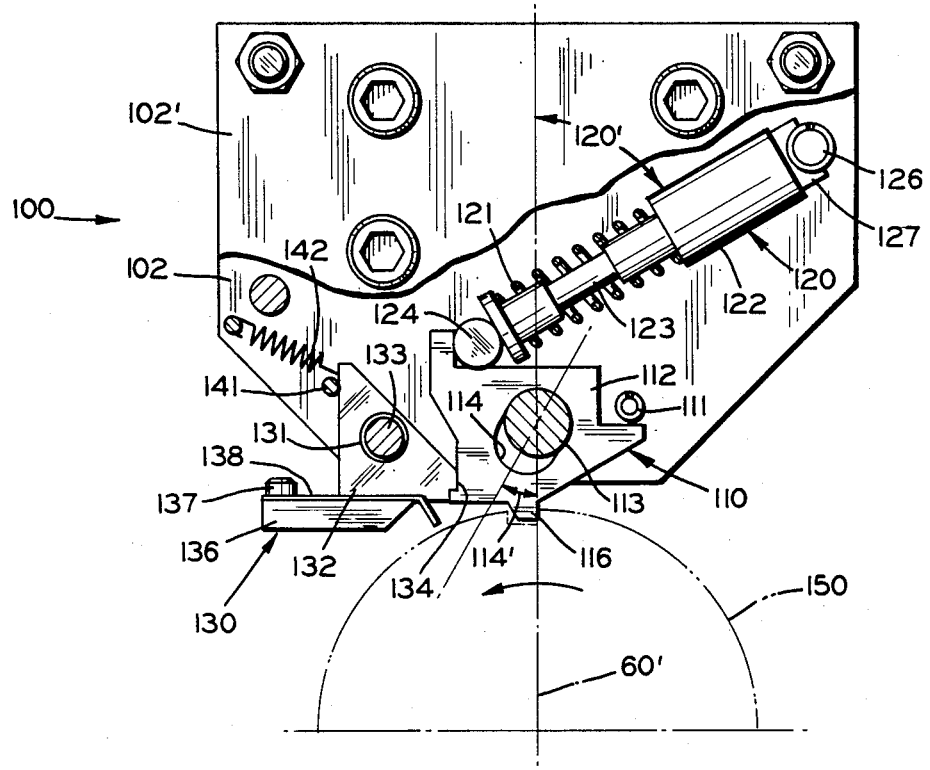
FIG. 7 is a view of the tool changer assembly taken along line 7—7 of FIG. 5.

Referring to FIGS 5 and 7, a tool release mechanism 100 is mounted on the tool magazine spindle 55. The tool release mechanism 100 includes upper and lower base plates 102 and 102', respectively, which are rigidly affixed to the spindle 55. The base plates are separated by spacers 101. The carousel 56 and the tool stations 60 are rotatable relative to the base plates.

The tool release mechanism 100 comprises a pawl assembly 110 and a movable stop assembly 130. The pawl assembly 110 rotates the tool holder lock nut 19 when the tool holder assembly 30 is positioned adjacent a tool station 60. The movable stop assembly 130 selectively permits or impedes movement of the pawl assembly 110, depending upon the orientation of the tool holder assembly 30.

The pawl assembly 110 includes a dog or pawl 112 rotatably and radially slidably mounted on a dowel pin 113 which extends through an elongated slot 114 in the pawl. The slot 114 extends at an angle 114' of about 30° relative to the radial center 60' of a tool station properly aligned under the release mechanism.

The pawl assembly 110 further includes a spring assembly 120 which extends at an angle 120' of about 60° relative to the tool station center 60'. The assembly includes a cylinder 122 rotatably mounted against a roll pin 126 secured to the base plates 102 and 102'. A rod 123 having a cylindrical or spherical end or pivot 124 is biased against the pawl 112. A pawl spring 121 biases the rod 123 toward the pawl 112, thereby biasing the pawl both in the radial direction outwardly toward a tool station 60 and rotatably away from the movable stop assembly 130. A roll pin 111 is positioned adjacent the pawl to limit rotation of the pawl 112 against bias of the pawl spring 121.

Figure 8:
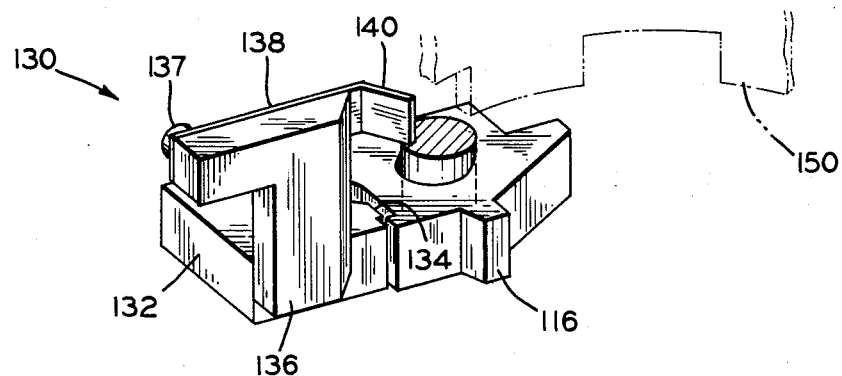
FIG. 8 is a fragmented isometric view of a portion of the tool changer assembly of FIG. 7.

The movable stop assembly 130 operates in conjunction with the pawl assembly 110, and comprises a movable stop 132 rotatably mounted on a dowel pin 133 secured between the base plates 102 and 102'. A needle bearing assembly 131 provides free rotation of the movable stop 132. As more clearly seen in FIG. 8, the movable stop 132 has a surface 134 for blocking engagement with the pawl 112. The movable stop assembly 130 further includes a follower support 136 affixed to the movable stop and a leaf spring 138 pivotally secured to the follower support 136 by a screw 137. The leaf spring 138 has a cam follower or finger 140 adapted to engage a cam as will be described. The cam follower 140 is adapted to engage the cam 150, which is secured to the support member 31 of the tool holder assembly 30, when the tool holder assembly 30 is positioned adjacent the tool station 60.

Referring again to FIG. 7, the movable stop assembly 130 further includes a roll pin 141 and a spring 142, both of which are mounted on the base plates 102 and 102'. The spring 142 biases the movable stop 132 in a counter clockwise direction as viewed in FIG. 7, i.e. toward the pin 141. The roll pin 141 prevents excessive movement under the force of the spring 142 and positions the movable stop 132 for engagement with the pawl 112.

TOOL CHANGER INDEXING

Figure 9:
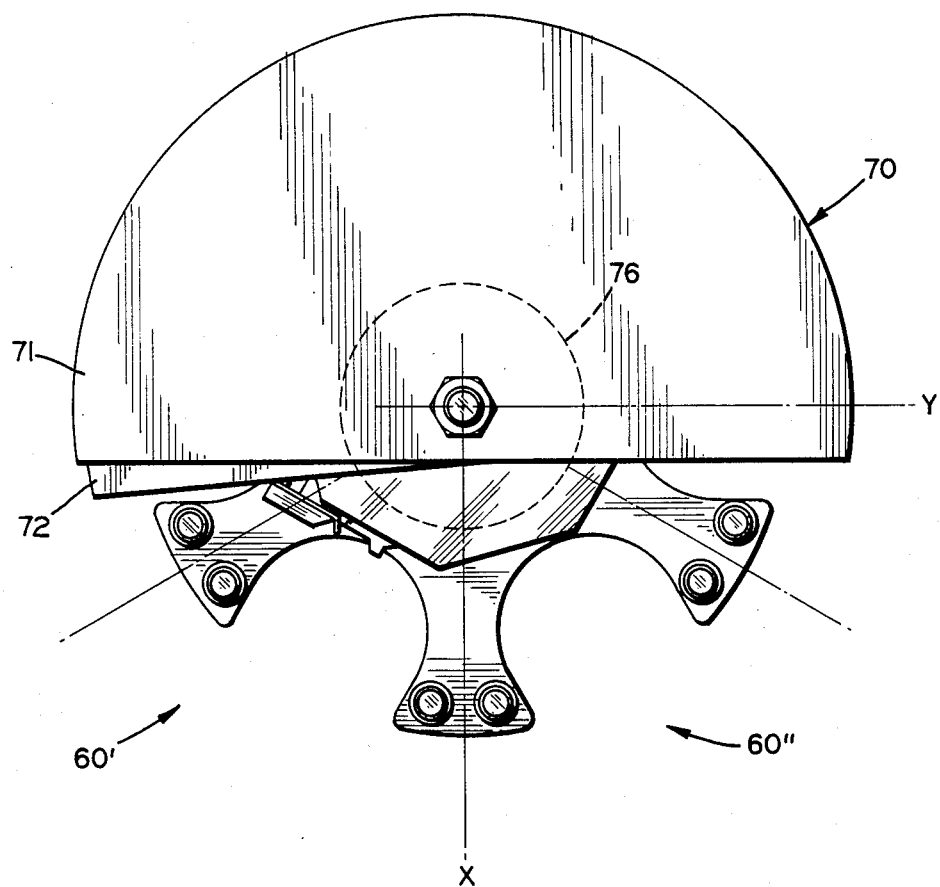
FIG. 9 is a top view of the tool changing apparatus of FIG. 1.

Referring to FIG. 9, it can be seen that at least two tool stations 60' and 60" are exposed when the cover assembly is open. This permits usage of a novel carousel rotation method. In a preferred mode of operation, the tool release station 60' is holding the tool previously used by the machine tool while the tool station in the tool pick-up location 60" is empty. The X and Y motors of the machine tool move the table 17 until the pick-up location 60" is directly under the spindle 8, which is holding a tool 10 and a tool holder assembly 30. The tool holder assembly 30 and tool are then lowered into the tool pick-up station 60".

With the tool and tool holder assembly in the tool pick-up station 60", the machine tool X and Y motors are utilized to move the table 17, whereby the tool and tool holder assembly are moved to the tool release location 60'. A new tool station, carrying the next tool to be used, is simultaneously rotated into the tool pick-up location 60". The detent assembly maintains proper positioning of the tool stations both during and between indexing of the carousel.

After such indexing of the carousel, the tool release station 60' is directly underneath the spindle 8. and tool holder assembly 30. The tool release mechanism 100 is then positioned to release the tool adaptor 11 from the tool holder assembly 30 as will be described hereinafter, allowing the tool 10 and tool adaptor 11 to drop into the tool station 66'. After release of the tool, the spindle 8 and tool holder assembly 30 are then raised, and the X and Y motors reposition the table 17 whereby the tool pick-up station 60" is under the tool holder assembly 30, where the next tool can be picked up. Because of the arcuate design of the collars 65, spindle movement along the verticle or Z axis is minimized during release and pick-up of tools because the open portion of the collars provide an entrance for the tools. This is particularly advantageous when long tools are used.

It is important to note that the carousel utilizes only a small portion of usable machine tool table space because only two tool stations need be within range of the machine tool. The back portion of the carousel can therefore be positioned on the extreme end of the table which is unreachable by the machine tool spindle.

OPERATION

When a tool change is necessary, the machine tool numerical control activates the cover assembly motor 76 to open cover door 72, and uses the X and Y motors to position the tool pick-up station 60" underneath the spindle 8. The carousel is then indexed to position the tool release mechanism 100 adjacent the spindle 8. The height of the spindle 8 and tool holder assembly 30 relative to the table allow tool holder assembly lock nut 19 to engage the pawl finger 116 as the tool changer is moved to the spindle 8. The vertical or Z axis position of the spindle 8 gives the tool adaptor about one-quarter inch to drop into its tool station.

Before engagement by the tool holder assembly, the spring 121 forces the pawl 112 radially outwardly and rotationally against roll pin 111. Upon engagement by the tool holder assembly, the spring 121 forces the pawl finger 116 to grip the first lock nut slot 21 which it engages as the spindle 8 rotates the tool holder assembly 30. If a lock nut slot 21 is not aligned with the pawl finger 116, the pawl will be pushed radially inwardly toward the center of the carousel. However, the spring assembly 120 continues to bias the pawl 112 toward the lock nut 19.

Simultaneously, when the release mechanism 100 is positioned adjacent the spindle 8, the cam 150 engages the cam follower 140 and deflects the leaf spring 138 if the cam follower 140 is aligned with a cam on the cam ring 150. The leaf spring 138 rotates away from the cam relative to the follower support 136 without rotating the movable stop 132. As the spindle 8 slowly rotates, the cam follower 140 drops into the next available slot in the cam ring 150, ready to engage the next cam surface.

After the pawl finger 116 engages a lock nut slot 21, continued spindle rotation turns the tool holder assembly support member 31 relative to the lock nut 19. If the lock nut 19 is on tightly, the pawl 112 is rotated away from pin 111 and into engagement with surface 134 of the stop 132. The stop 132 therefore blocks rotation of the pawl 112 which blocks rotation of the lock nut. The initial torque required to break loose the lock nut 19 from the support member 31 may reach or exceed about 150 inch-pounds. The resisting torque is from the friction between the threads of the nut 19 and the support member 31 and from the friction between the tool adaptor lugs 14 and the mating lock nut surfaces. After the nut 19 is broken loose, the pawl 112 spring 121 rotates the pawl against pin 111, thereby freeing movable stop 132 to rotate.

The automatic closing spring of the tool holder assembly 30 is compressed as the spindle continues to turn after the lock nut 19 is broken loose from the support member 31. A torque of 10 to 15 inch-pounds is required to compress the spring, which is insufficient to overcome the force of the pawl spring 121. Camming surfaces 25' on the nut engage the top of the adaptor lugs 14 to eject the adaptor when the nut has rotated between 45° and 60° relative to the support member 31. The torque required for ejection may sometimes reach 70 inch-pounds.

The spindle 8 rotates the cam 150 into engagement with the cam follower 140 as the nut 19 rotates. The tool is thereby ejected, and falls into its tool station. After engagement of the cam and cam follower, further rotation of the spindle 8 rotates the follower support 136 and the movable stop 132 (which has been disengaged from the pawl) clockwise about the pin 133 against the force of spring 142. The movable stop surface 134 is unable to engage the pawl 132 after a minimal rotation.

Shortly thereafter, the nut 19 engages the tool holder assembly support member stop 37. Continued rotation of the spindle 8 thereby rotates the nut 19, which in turn rotates the pawl 112 about dowel post 113. The pawl finger 116 is ultimately forced out of the slot 21. Further rotation of the spindle 8 harmlessly rotates the tool holder assembly, with the pawl finger 116 sliding around the lock nut on smooth surface 19', unable to grip a lock nut slot 21.

Next, the X & Y motors move the tool holder assembly 30 out of the range of the pawl 116, and the spindle 8 is raised along the Z-axis to clear the tool adaptor 11. The X and Y motors move the milling machine table 17 to position the tool pick-up station 60" underneath the spindle 8. The tool holder 30 is lowered by the Z axis motor to about one-quarter inch below the release elevation. In most instances, the adaptor lugs 14 will not align with the lock nut slots 25 and support member slots 34, which will themselves be aligned because the nut 19 is in its open position. Tool adaptor 11 will therefore be pushed downward approximately one-half inch, thereby pushing the tool station 60 downward on its posts 61 and compressing the springs 62.

The spindle 8 is then rotated slowly in a counter-clockwise direction. The sliding friction forces between the ledge 65' and the underside 15' of the nose ring overcomes the friction between the upper surface of the tool adaptor lugs 14 and the tool holder assembly 30 and prevents relative rotation of the adaptor 11 and the tool station 60. Before a 180° rotation of the spindle, the adaptor lugs 14 will align with the slots 25 and 34 and the tool adaptor 11 will be pushed up into the tool holder assembly 30 by the springs 62. One of the lugs 14 will engage the trigger pin 27, thereby releasing the latch 26 and allowing the compression spring to rotate the nut in a clockwise direction relative to the support member, thereby locking the tool adaptor to the tool holder 30 and spindle 8.

According to the tool changer indexing method, the X and Y motors move the table in a path which rotates the tool pick-up station 60° to the former position of the tool release station, whereby it becomes the tool release station during the next tool change sequence. Next, the X and Y motors position thw workpiece 18 under the new tool, while the numerical control signals the AC motor to close the tool magazine door 72.

The foregoing has been a description of a presently preferred embodiment of the invention. Numerous modifications and adaptations may be made and not departing from the spirit and scope of the invention as set forth in the following claims.

What is claimed is:

1. A tool magazine for use in conjunction with an automatic tool changing system, said tool magazine comprising stationary support means for mounting on a laterally movable machine tool table and movable therewith, said machine tool table movable in an X-Y plane, and a rotatable carousel rotatably supported on said stationary support means and having a plurality of tool stations, said carousel having a Z-axis of rotation perpendicular to said X-Y plane.

2. A tool magazine as defined in claim 1 further comprising a cover assembly for protecting said carousel, said cover assembly having a door, wherein said tool magazine further comprises means for selectively opening said door to expose at least two of said tool stations.

3. A tool magazine as defined in claim 2 wherein said means for selectively opening said door comprises an independently operable AC motor.

4. In a machine tool comprising a spindle for holding a tool, a laterally movable machine tool table for supporting a workpiece, X-axis and Y-axis motors for operatively positioning said table and said workpiece relative to said tool, and a carousel supported by said machine tool table having a plurality of tool stations, an improvement comprising means for selectively rotating said carousel, wherein said means comprises said X-axis and Y-axis motors.

5. A tool magazine as defined in claim 4, wherein at least one of said tool stations includes a collar for receiving a tool adaptor supporting said tool and adapted to be selectively grasped and released by a tool holder, said tool holder being rotatably supported by said spindle, said collar comprising a clutch surface for frictionally engaging said tool adaptor during rotation of said tool holder.

6. A tool magazine as defined in claim 5 further comprising a base and means for permitting relative movement in a first direction between said base and said collar.

7. A tool magazine as defined in claim 6 wherein said collar is movable relative to said base in a second direction generally perpendicular to said first direction.

8. A tool magazine as defined in claim 7, wherein said collar is mounted on said carousel, and further comprising another tool station having another tool-receiving collar mounted on said carousel, wherein said another collar is independently mounted relative to said first mentioned collar.

9. A tool magazine as defined in claim 5 wherein said collar is arcuate and is less than 360° circumferentially.

10. A method of selectively rotating a tool carousel with a machine tool, a laterally movable machine tool table for supporting and moving a workpiece therewith, said carousel having a plurality of tool stations, said machine tool comprising a spindle for holding a tool, and X-axis and Y-axis motors for positioning said table and workpiece relative to said tool; said method comprising moving said carousel and its supporting tool table with said X-axis and Y-axis motors to a position wherein one of said tool stations is adjacent said tool, engaging said tool station with said tool, and moving said carousel with said X-axis and Y-axis motors relative to said tool.

* * * * *